United States Patent Office 3,495,312
Patented Feb. 17, 1970

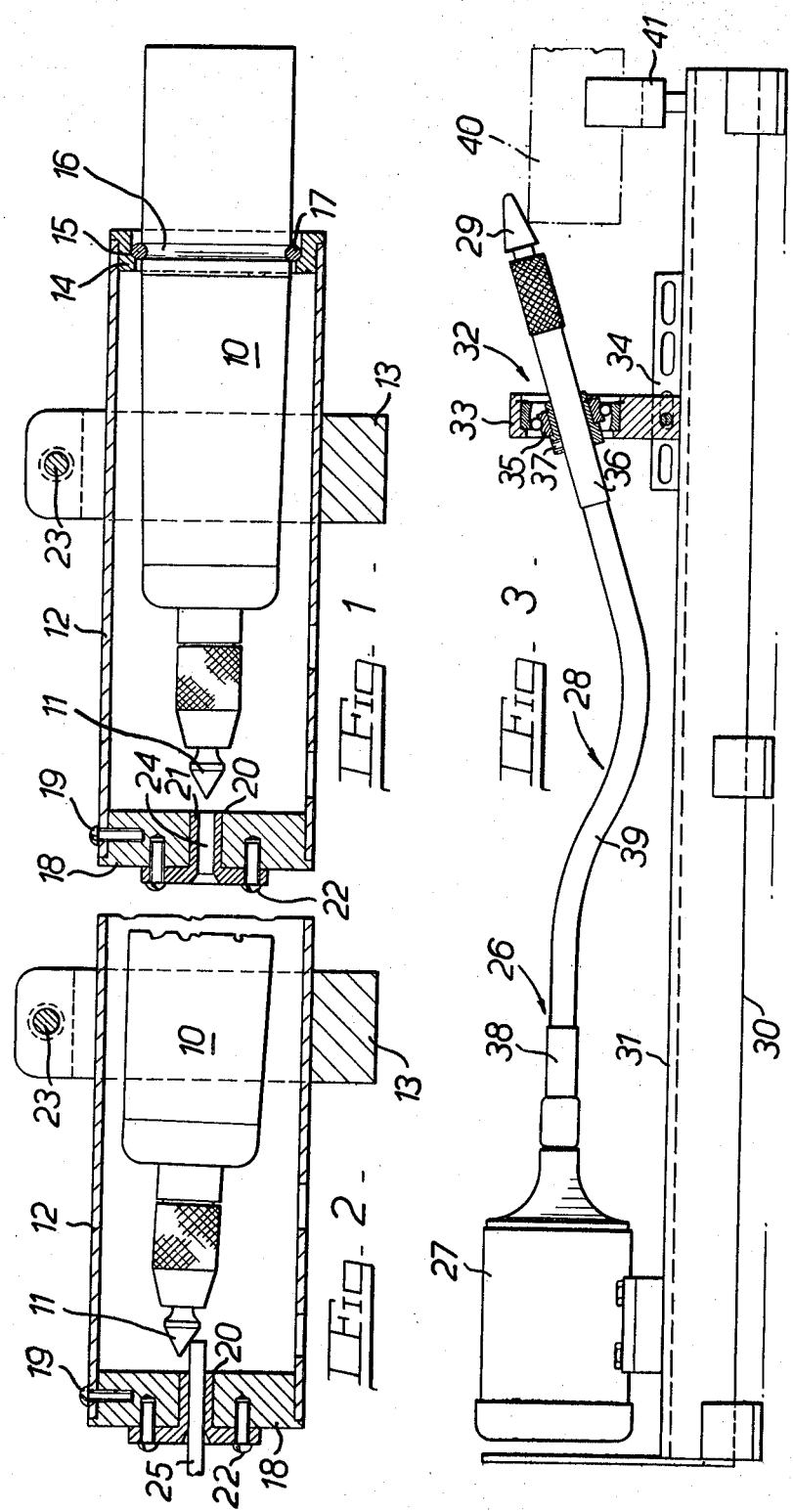

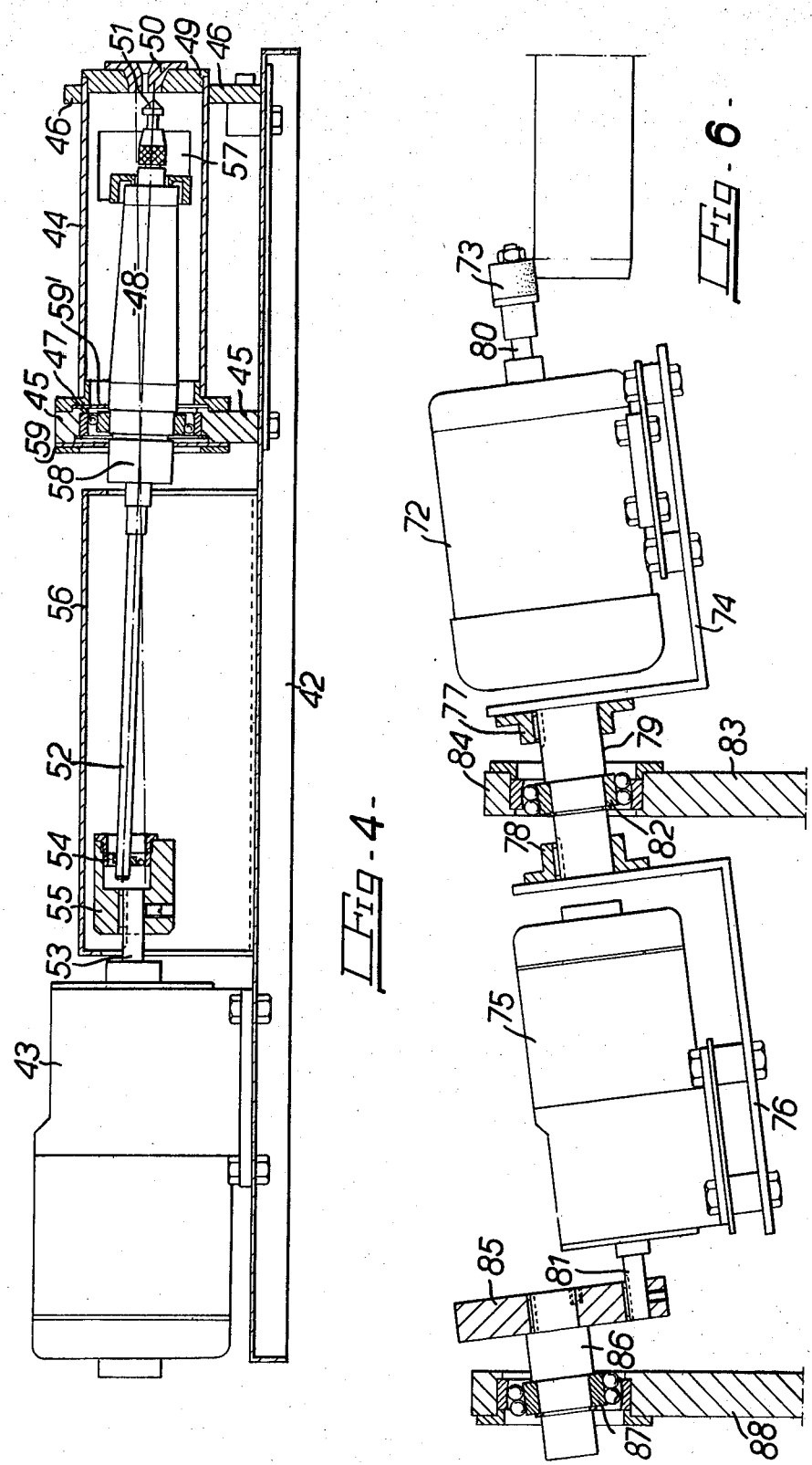

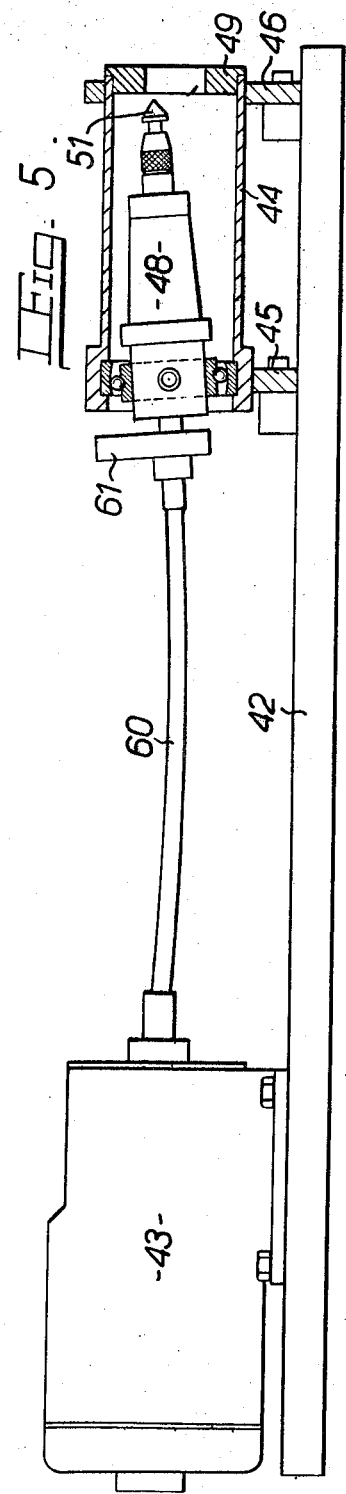

3,495,312
REMOVAL OF MATERIAL FROM THE
END OF A BAR OR TUBE
Derek W. R. Walker, Four Gates, Hopstone, Claverley,
Wolverhampton, Staffordshire, England
Filed Apr. 26, 1968, Ser. No. 724,447
Int. Cl. B23d 67/00
U.S. Cl. 29—76      11 Claims

ABSTRACT OF THE DISCLOSURE

Apparatus for removing surplus material from the end of a workpiece such as a bar or tube whereby the apparatus comprises a rig which enables a rotary cutting tool to be supported in a manner such that when the workpiece is pushed against the cutter of the tool, the cutter, or the tool and cutter as one unit, impels itself around the end of the workpiece by frictional contact. Alternatively, the tool is supported in a rig so that the cutter swings around a predetermined path impelled by an independent motor driving through an eccentric.

---

This invention relates to apparatus for removing material from the end portion of a workpiece, and is particularly although not exclusively concerned with the pointing or chamfering of the ends of wire, bar, or tube of circular cross section.

It is well known to remove flash from the end of a workpiece such as a bar or tube by passing a rotating bur, cutter, or rotary file around it. This invention introduces an arrangement whereby the driving means for the cutter is given a swinging action by an independently rotated eccentric rigidly fixed to the said driving means causing the cutter to swing around the workpiece; alternatively the driving means itself is spring mounted allowing the rotating cutter to swing itself, impelled by friction, around the workpiece.

The apparatus of this invention can be applied for the removal of flash or for providing points or chamfers on the ends of elongated workpieces which may be of circular section or of any other cross section which is regular or symmetrical, for example, workpieces of square of hexagonal section.

According to the invention there is provided apparatus for removing material from the end portion of a workpiece, comprising a cutting head (which term is used herein generically to include any form of bur, cutter or rotary file), or a holder for such a head, the head or holder being rotatable by a motor about its own axis so that in use the head can effect removal of the material, the head or holder being supported in a universal mounting enabling it to be swung bodily about a point or neighbouring points on the axis of the workpiece, and thus to be rotated bodily in a closed path around the axis of the workpiece to effect removal of the material, the arrangement being such that when the head is in use it is constrained to rotate bodily in such path either by its being biased into contact with the work or by other means.

Five embodiments of the invention will now be described with reference to the accompanying drawings wherein:

FIGURE 1 is a sectional elevation of the first embodiment;

FIGURE 2 is a sectional elevation of the apparatus shown in FIGURE 1 in the grinding position;

FIGURE 3 is an elevation of a second embodiment of the invention, partly in section;

FIGURE 4 is a sectional elevation of a third embodiment;

FIGURE 5 is a sectional elevation of a fourth embodiment; and

FIGURE 6 is an elevation of a fifth embodiment.

In the embodiment illustrated in FIGURES 1 and 2 the apparatus comprises three main components, a pneumatically driven rotary cutting tool 10 which includes a tapered cutting head 11, a tubular sleeve 12 in which the tool 10 is movably mounted and a base member 13 adapted to support the tubular sleeve on a bench or workrig. A bush 14 is located in one end of the sleeve 12. The bush is formed with a peripheral flange at one end thereof and an axial bore which has been countersunk from the flanged end so that a seat 15 of rounded cross-section is formed intermediate its end faces. The bush is located in the sleeve 12 with the flange abutting the end of the sleeve. The tool 10 has a circumferential groove 16 of half circular section formed in its outer casing and this groove receives a rubber bearing ring 17 of circular cross-section. The arrangement is such that the ring forms a self-centering universal mounting for the tool 10. The cutting head 11 is positioned adjacent to the other end of the sleeve 12. This end of the tubular sleeve 12 also receives a flanged bush, 18, which is locked to the sleeve 12 by a screw 19. The bush 18 has a bore 20 co-axial with the bore of the bush 14 but of a reduced diameter. The bore 20 accommodates a tubular insert 21 which is attached to the outside face of the bush 18 by means of screws 22 passing through a disk-like head into the bush 18. The insert 21 forms a sizing or gauging member for the workpiece and has a hole 24 passing through its centre which is just large enough to allow the workpiece to slide in it.

The base member 13 is in the form of a gapped circular clamp the sides of which grip the sleeve 12 when a pinch bolt 23 is tightened.

In use, when a cylindrical workpiece 25 is inserted into the hole 24 and pushed against the tapered cutting head 11 which is rotating, as illustrated in FIGURE 2, the friction between contacting parts impels the head to track around the periphery of the workpiece 25 as it mills away excess material to provide a pointed or chamfered end. The resilience of the ring 17 urges the cutting head 11 towards the centralised position at all times.

A second embodiment of the invention, which also employs the frictional force between the contacting parts as described above to provide a circular or swinging movement of the head, is illustrated in FIGURE 3. In this embodiment the rotary cutting tool 26, which comprises the combination of a motor 27, flexible drive 28 and cutting head 29, is mounted on an elongated base member 30 which is provided with a channelled portion 31 extending longitudinally of the member. The drive motor 27 is adjustably mounted in the channelled portion 31 adjacent one end of the base 30, and a spherical bearing assembly 32 is mounted on the base member 30 at a position between its middle and other end. The spherical bearing assembly 32 comprises a housing 33, which is adjustably fixed to a frame 34 carried by the base of the member 30, and a conventional ball bearing 35, which is held within the housing so that its plane of rotation when centralised is normal to the longitudinal axis of the base member 30. The inner race 37 of the bearing 35 is made fast to a rigid sleeve 36 positioned at the end of the flexible drive 28 extending between the motor 27 and the bearing assembly 32. The sleeve 36 forms one rigid part of the outer casing 39 of the flexible drive 28 and extends on either side of the bearing assembly 32. A second rigid part of the flexible drive 28 is formed by a swivel joint 38 which makes the connection between the flexible drive and the motor 27. The inner drive member (not shown) of the flexible drive drives the cutting head 29 whilst the outer casing 39 can rotate independently of the cutting head.

The relative positions of the motor 27 and the bearing assembly 32 are adjusted so that the flexible drive 28 is bowed and in consequence the rigid sleeve 36 supporting the cutting head 29 in the spherical bearing 32 is inclined to the axis of the motor 27. By varying the relative postiions of the motor 27 and bearing assembly 32 the extent of the bowing is varied, and consequently the diameter of the circular path followed by the cutting head 29 is varied. The workpiece 40 which is supported in a V block 41 on the base member 30 is moved to a position in which the peripheral edge of the workpiece at one end contacts the tapered face of the cutting head 29. In use when the motor 27 drives the cutting head 29 and when the head is in contact with the peripheral edge of the workpiece 40, the friction between the two parts causes the head 29 to follow a substantially circular path around the end of the workpiece whilst flexible drive 28 swivels in the spherical bearing 32. Due to the resilience of the flexible drive 28 it is possible for the cutting head 29 to be deflected to a position outside its normal circular path, but it will return to this path when freed. This arrangement is particularly suited to workpieces of several inches in diameter.

In a third embodiment of the invention as illustrated in FIGURE 4 the arrangement is largely similar to that shown in FIGURES 1 and 2. In the FIGURE 4 embodiment an elongated base member 42 supports a drive motor 43 adjacent to one end thereof and a tubular sleeve 44 adjacent to the other end thereof. The sleeve 44 is rigidly supported on the base member 42, so that its sides are parallelled therewith, by means of a bearing housing 45 connected to one end of the sleeve and to the base member and by means of a support bracket 46 at its other end. The housing 45 accommodates a self-aligning bearing 47, which supports one end of an air motor 48 held fast by the inner race of the bearing. The motor 48 is swingable in the bearing 47 but is prevented from rotating as a whole about its own axis. The bearing is protected by rubber seals 59 and 59'. The body of the air motor 48 extends into the sleeve 44 to a point adjacent to the end remote from the bearing 47. In a manner similar to the FIGURE 1 and 2 embodiment this end of the sleeve 44 carries an apertured bush 49 and a tubular insert 50 which in use acts as the gauge for the workpiece. In the FIGURE 4 embodiment however the cutting head 51 is driven separately by the air motor 48, and the circular path followed by the cutting head in use is controlled by means of a straight and rigid shaft 52, held fast at one end within the inner race of a self-aligning bearing 54 mounted eccentrically on the motor drive shaft 53 and rigidly connected at its other end to the end of the motor 48. The bearing 54 is eccentrically mounted within a housing 55 keyed to the motor drive shaft 53 and the arrangement is such that the self-aligning bearing 47 is concentric with the drive shaft 53 but not with the self-aligning bearing 54. Since the shaft 52 is a straight shaft and is rigidly connected to the air motor 48 the latter will be disposed at an angle to the horizontal in the bearing 47 and the cutting head 51 will be offset from the centre of the bush 49 to an extent proportional to the offset of the bearing 54 from the drive shaft 53. Thus when the drive shaft 53 rotates the motor 48 will swing in the bearing 47 and the cutting head 51 will follow a circular path. With this arrangement it is possible to "set" the workpiece relative to the tool so that a point having a true centre can be machined on its end. A guard 56 is provided to protect the user from the shaft 52. An aperture 57 is also provided in the sleeve 44 adjacent to the cutting head 51 so that the swarf can be cleared. Air to drive the air motor 48 enters at the connection 58.

The embodiment shown in FIGURE 5 is largely similar to that in FIGURE 4 and similar parts are given the same reference numerals. In the FIGURE 5 embodiment the shaft 52 is replaced by a flexible drive 60 which is driven through suitable reduction gearing from the motor 43. The flexible drive 60 operates to rotate a weight 61 mounted on the rear end of the air motor 48, the weight being rotatable relative to the motor about the axis of the motor. In use, rotation of the weight 61 by the motor 43 tends to cause the motor 48 to swing away from the main axis of the apparatus. The cutting head is thus urged into engagement with the inside surface of a tubular workpiece (not shown) and follows a substantially circular path inside the workpiece, as defined by the workpiece.

In a fifth embodiment of the invention as illustrated in FIGURE 6 an arrangement is provided which is similar in principle to that illustrated in FIGURE 4. In the FIGURE 6 embodiment a motor 72 for driving a cutting head 73 is mounted on a right angled frame member 74 and is rigidly connected in tandem to a second motor 75 mounted on a similar frame member 76. The frame members 74 and 76 each have an end plate extending parallel with the inner end of their respective motors 72 and 75 and normal to the longitudinal axes of the motors. These end plates carry tubular supports 77 and 78 in which a short connecting shaft 79 is keyed. The tubular supports 77 and 78 are concentric with drive shafts 80 and 81 of their respective motors and with each other. Thus the drive shafts 80 and 81 are aligned.

The connecting shaft 79 is stepped at a point mid way between its ends and this step provides a location for a spherical bearing 82. The bearing 82 is movably located within a housing 84 on one end of a support 83 which is connected to a bench or rig (not shown). The motor 75 provides the drive which controls the swinging motion of the cutting head 73 and this is achieved by means of a cranked arm 85 which is keyed to the drive shaft 81 extending from that end of the motor 75 which is remote from the bearing 84. An end portion 86 of the cranked arm is journalled in a second spherical bearing 87. The bearing 87 is connected to the bench or rig (not shown) by a support 88 similar to the support 83 and since the centre of the bearing 87 is offset from that of bearing 82 the tandem pair of motors 72 and 75 are supported at an angle to the horizontal. In use rotation of the drive 81 will cause the motors to swing about the bearing 82 and the cutting head 73 to follow a predetermined circular path as in the FIGURE 4 embodiment.

It will be appreciated that in any of the embodiments described electrically driven motors could replace the air motors mentioned.

What is claimed is:

1. Apparatus for removing material from the end portion of a workpiece comprising a cutter, a motor connected to the cutter to rotate the same about its own axis, the cutter being supported in a universal mounting and means to cause the cutter to swing in the universal mounting and follow a closed path about the axis of the workpiece.

2. Apparatus according to claim 1 in which the cutter is driven through a flexible drive from a fixed motor and the cutter is supported in the universal mounting at a position spaced from the motor, and relative positions of the motor and the mounting being adjustable to enable the flexible drive to be bowed to a varying extent and thus to carry the inclination of the axis of the cutter and the diameter of the path in which the cutter moves if it is otherwise unconstrained.

3. Apparatus according to claim 1 in which the motor and the cutter are directly connected together and are movably supported in the universal mounting.

4. Apparatus according to claim 3 in which the universal mounting for the motor and cutter includes resilient means adapted to embrace the motors and to engage a fixed part of the mounting.

5. Apparatus according to claim 4 in which the resilient means comprises a rubber or rubber-like ring, the inner part of the ring entering an annular groove about the body of the motor and the outer part entering an annular recess in a fixed member.

6. Apparatus according to claim 3 in which the motor is connected through a coupling to an eccentric, the eccentric being rotatable by a separate motor means such that the motor and cutter swing in the universal mounting and the cutter follows a pre-determined circular path.

7. Apparatus according to claim 6 in which the coupling comprises a substantially rigid shaft which is aligned with and fixed to the motor and is connected to the eccentric by means of a universal bearing.

8. Apparatus according to claim 6 in which the coupling is supported in a universal bearing disposed between the motor and the separate motor means and the eccentric constitutes a cranked arm connected to the drive of the separate motor means and constrained within a universal bearing.

9. Apparatus according to claim 3 in which an eccentric weight is mounted on the motor which drives the cutter, the weight being rotatable about the axis of the cutter and driven by an independent motor.

10. Apparatus according to claim 9 in which the independent motor is fixed and is coupled to the eccentric through a flexible drive.

11. Apparatus according to claim 1 including a fixed holder for the workpiece.

References Cited

UNITED STATES PATENTS

| | | | |
|---|---|---|---|
| 1,859,006 | 5/1932 | Schaad | 29—76 X |
| 2,323,188 | 6/1943 | Atkinson | 29—76 |
| 2,821,813 | 2/1958 | Degler | 29—76 X |
| 2,933,800 | 4/1960 | Friden | 29—76 |

HARRISON L. HINNNSON, Primary Examiner